(12) United States Patent
Ferguson et al.

(10) Patent No.: US 9,868,374 B2
(45) Date of Patent: Jan. 16, 2018

(54) MODULAR MONOCOQUE BACKREST

(71) Applicant: AMI Industries, Inc., Colorado Springs, CO (US)

(72) Inventors: Keith M. Ferguson, Colorado Springs, CO (US); Douglas E. Hoover, Colorado Springs, CO (US)

(73) Assignee: AMI INDUSTRIES, INC., Colorado Springs, CO (US)

( * ) Notice: Subject to any disclaimer, the term of this patent is extended or adjusted under 35 U.S.C. 154(b) by 169 days.

(21) Appl. No.: 15/074,797

(22) Filed: Mar. 18, 2016

(65) Prior Publication Data

US 2017/0267146 A1    Sep. 21, 2017

(51) Int. Cl.
| | |
|---|---|
| *B60N 2/68* | (2006.01) |
| *B60R 22/36* | (2006.01) |
| *B60N 2/66* | (2006.01) |
| *A47C 5/12* | (2006.01) |

(52) U.S. Cl.
CPC .............. *B60N 2/686* (2013.01); *A47C 5/12* (2013.01); *B60N 2/66* (2013.01); *B60N 2/682* (2013.01); *B60R 22/36* (2013.01)

(58) Field of Classification Search
None
See application file for complete search history.

(56) References Cited

U.S. PATENT DOCUMENTS

| | | | | |
|---|---|---|---|---|
| 4,108,492 A | * | 8/1978 | Kirby ..................... | A47C 7/021 297/284.3 |
| 4,123,105 A | * | 10/1978 | Frey ........................ | A47C 5/12 297/451.1 |
| 4,133,579 A | * | 1/1979 | Springfield .............. | A47C 1/12 297/452.65 |
| 4,555,137 A | * | 11/1985 | Goldner ................... | A47C 7/46 297/284.4 |
| 5,048,894 A | * | 9/1991 | Miyajima ................ | B60N 2/38 297/452.11 |
| 5,662,381 A | * | 9/1997 | Roossien ................. | A47C 3/12 297/301.1 |

(Continued)

FOREIGN PATENT DOCUMENTS

| | | |
|---|---|---|
| DE | 19757060 | 6/1999 |
| DE | 102013225477 | 3/2015 |

(Continued)

OTHER PUBLICATIONS

EP Search Report dated Jul. 27, 2017 in EP Application No. 17159520.0.

*Primary Examiner* — David E Allred
(74) *Attorney, Agent, or Firm* — Snell & Wilmer, L.L.P.

(57) ABSTRACT

A modular monocoque backrest is provided. The modular monocoque backrest may comprise a front shroud, a back shroud, and an at least one back spar. The front shroud may be coupled to the back shroud, and the back spar may be configured as a mounting point, enabling the modular monocoque backrest to mount to an aircraft floor. The front shroud and the back shroud may comprise a carbon fiber composite material, allowing the modular monocoque backrest to be modular in nature. The carbon fiber composite material may enable the modular monocoque backrest to have a lightweight design while also maintaining resistance to dynamic crash loads.

16 Claims, 5 Drawing Sheets

(56) References Cited

U.S. PATENT DOCUMENTS

| | | | | |
|---|---|---|---|---|
| 5,879,055 A * | 3/1999 | Dishner | ............... | B60N 2/0715 297/218.3 |
| 5,895,096 A * | 4/1999 | Massara | ................... | B60N 2/70 297/452.18 |
| 5,988,757 A | 11/1999 | Vishey | | |
| 6,189,972 B1 * | 2/2001 | Chu | ....................... | A47C 7/465 297/284.4 |
| 6,260,921 B1 * | 7/2001 | Chu | ....................... | A47C 7/465 297/284.4 |
| 7,954,762 B2 | 6/2011 | Boren et al. | | |
| 7,967,380 B2 * | 6/2011 | Omori | ................... | B60N 2/4885 297/216.12 |
| 8,052,213 B2 * | 11/2011 | Dahlbacka | ............... | B60N 2/66 297/284.4 |
| 8,132,857 B2 * | 3/2012 | Omori | ................... | B60N 2/4885 297/216.1 |
| 2006/0061202 A1 | 3/2006 | Meneses | | |
| 2006/0152062 A1 | 7/2006 | Archambault | | |
| 2007/0138855 A1 | 6/2007 | Kespohl | | |
| 2009/0045658 A1 | 2/2009 | Humer | | |
| 2010/0066145 A1 * | 3/2010 | Akutsu | ................ | B60N 2/4885 297/301.5 |
| 2011/0210588 A1 * | 9/2011 | Omori | ................... | B60N 2/4885 297/216.12 |
| 2013/0328371 A1 * | 12/2013 | Marini | ..................... | B60N 2/24 297/354.1 |
| 2015/0008716 A1 * | 1/2015 | Dry | ......................... | B60N 2/44 297/452.18 |
| 2015/0145303 A1 * | 5/2015 | Line | ....................... | B60N 2/643 297/283.3 |
| 2015/0158591 A1 * | 6/2015 | Marini | ..................... | B60N 2/24 297/354.1 |
| 2016/0009209 A1 | 1/2016 | Cao | | |
| 2016/0353891 A1 * | 12/2016 | Battey | ................... | A47C 1/032 |

FOREIGN PATENT DOCUMENTS

| | | |
|---|---|---|
| DE | 102013225963 | 6/2015 |
| EP | 0972673 | 1/2000 |
| WO | 2015191709 | 12/2015 |

* cited by examiner

MODULAR MONOCOQUE BACKREST

FIELD

The present disclosure relates to seats, and more specifically, to a seat with a modular monocoque backrest.

BACKGROUND

Traditional aircraft passenger seats may use heavy metallic materials in the backrest structure to endure various stress loads and to create a sufficient load bearing system. A typical backrest may comprise an aluminum or metallic frame with shear panels, side beams, and cross bars to take inflight stress loads and crash loads. A heavy torque tube may also be introduced in the lumbar area, to take torsional loads in the forward direction caused by an asymmetric shoulder belt. Due to the amount of heavy metallic materials used, typical backrest structures may be heavy and costly.

SUMMARY

In various embodiments, a seat backrest is disclosed. The seat backrest may comprise a front shroud. The front shroud may be formed from a first molded carbon fiber composite. The seat backrest may also comprise a back shroud. The back shroud may be coupled to the front shroud, and may be formed from a second molded carbon fiber composite. The seat backrest may also comprise an at least one back spar. The at least one back spar may be coupled between the front shroud and the back shroud, and may extend in a direction away from the front shroud and the back shroud.

In various embodiments, the seat backrest may also further comprise the following. A headrest bracket may be coupled at a first end to the back shroud, and at a second end to the front shroud. A lumbar support mechanism may be coupled to the front shroud. A restraint exit may be coupled to the back shroud. The restraint exit may define a void on the back shroud, and the void may be configured to allow passage of a shoulder restraint belt. A restraint inertia reel may be coupled to the back shroud. The restraint inertia reel may be configured to deploy and retract the shoulder restraint belt through the restraint exit. The restraint exit may comprise a restraint support having a top surface opposite of a bottom surface. The bottom surface may be coupled to the back shroud. A restraint bezel may be coupled to the top surface. The restraint exit may comprise the second carbon fiber composite material. In this regard, the restraint exit may be molded with the back shroud such that the back shroud and the restraint exit comprise a single continuous part. The at least one back spar may comprise an aluminum material. The at least one back spar may comprise a plurality of cross bracings.

In various embodiments, a modular monocoque backrest is disclosed. The modular monocoque backrest may comprise a front shroud. The front shroud may have a cushion support surface opposite of a first connecting surface. The front shroud may comprise a first carbon fiber composite material. The modular monocoque backrest may comprise a back shroud. The back shroud may have a second connecting surface opposite of a back surface. The back shroud may comprise a second carbon fiber composite material. The second connecting surface of the back shroud may be integrally couple to the first connecting surface of the front shroud, such that the front shroud and the back shroud form a single integrated object. The modular monocoque backrest may also comprise an at least one back spar. The at least one back spar may have a top end opposite of a bottom end. The top end may be configured to couple at a first edge to the first connecting surface of the front shroud and couple at a second edge to the second connecting surface of the back shroud. The bottom end may extend in a direction away from the front shroud and the back shroud.

In various embodiments, the modular monocoque backrest may also further comprise the following. A headrest bracket may be coupled at a first end to the second connecting surface of the back shroud and coupled at a second end to the first connecting surface of the front shroud. A lumbar support mechanism may be coupled to the cushion support surface of the front shroud. A restraint exit may be coupled to a top of the back shroud. The restraint exit may define a void on the top of the back shroud, configured to allow passage of a shoulder restraint belt. A restraint inertia reel may be coupled to the second connecting surface of the back shroud. The restraint inertia reel may be configured to deploy and retract the shoulder restraint belt through the restraint exit. The restraint exit may comprise a restraint support coupled to the top of the back shroud and a restraint bezel coupled to the top of the restraint support. The restraint exit may comprise the second carbon fiber composite material. In this regard, the restraint exit may be molded with the back shroud such that the back shroud and the restraint exit comprise a single continuous part. The at least one back spar may comprise an aluminum material. The at least one back spar may comprise a plurality of cross bracings.

In various embodiments, a method of manufacturing a modular monocoque backrest is disclosed. The method may comprise forming a front shroud having a cushion support surface opposite of a first connecting surface. The front shroud may comprise a first carbon fiber composite material. The method may comprise forming a back shroud having a second connecting surface opposite of a back surface. The back shroud may comprise a second carbon fiber composite material. The method may comprise coupling the first connecting surface of the front shroud to the second connecting surface of the back shroud. The method may also comprise coupling an at least one back spar to the front shroud and the back shroud. The back shroud may comprise a top end opposite of a bottom end. The top end may be configured to couple at a first edge to the first connecting surface of the front shroud and couple at a second edge to the second connecting surface of the back shroud. The bottom end may extend in a direction away from the front shroud and the back shroud. In various embodiments, the front shroud may be coupled to the back shroud via an epoxy adhesive.

The forgoing features and elements may be combined in various combinations without exclusivity, unless expressly indicated herein otherwise. These features and elements as well as the operation of the disclosed embodiments will become more apparent in light of the following description and accompanying drawings.

BRIEF DESCRIPTION OF THE DRAWINGS

The subject matter of the present disclosure is particularly pointed out and distinctly claimed in the concluding portion of the specification. A more complete understanding of the present disclosure, however, may best be obtained by referring to the detailed description and claims when considered in connection with the following illustrative figures. In the following figures, like reference numbers refer to similar elements and steps throughout the figures.

Elements and steps in the figures are illustrated for simplicity and clarity and have not necessarily been rendered according to any particular sequence. For example, steps that may be performed concurrently or in different order are illustrated in the figures to help to improve understanding of embodiments of the present disclosure.

DETAILED DESCRIPTION

The detailed description of exemplary embodiments herein makes reference to the accompanying drawings, which show exemplary embodiments by way of illustration. While these exemplary embodiments are described in sufficient detail to enable those skilled in the art to practice the disclosures, it should be understood that other embodiments may be realized and that logical changes and adaptations in design and construction may be made in accordance with this disclosure and the teachings herein. Thus, the detailed description herein is presented for purposes of illustration only and not of limitation.

The scope of the disclosure is defined by the appended claims and their legal equivalents rather than by merely the examples described. For example, the steps recited in any of the method or process descriptions may be executed in any order and are not necessarily limited to the order presented. Furthermore, any reference to singular includes plural embodiments, and any reference to more than one component or step may include a singular embodiment or step. Also, any reference to attached, fixed, coupled, connected or the like may include permanent, removable, temporary, partial, full and/or any other possible attachment option. Additionally, any reference to without contact (or similar phrases) may also include reduced contact or minimal contact. Surface shading lines may be used throughout the figures to denote different parts but not necessarily to denote the same or different materials.

Figure 1A:
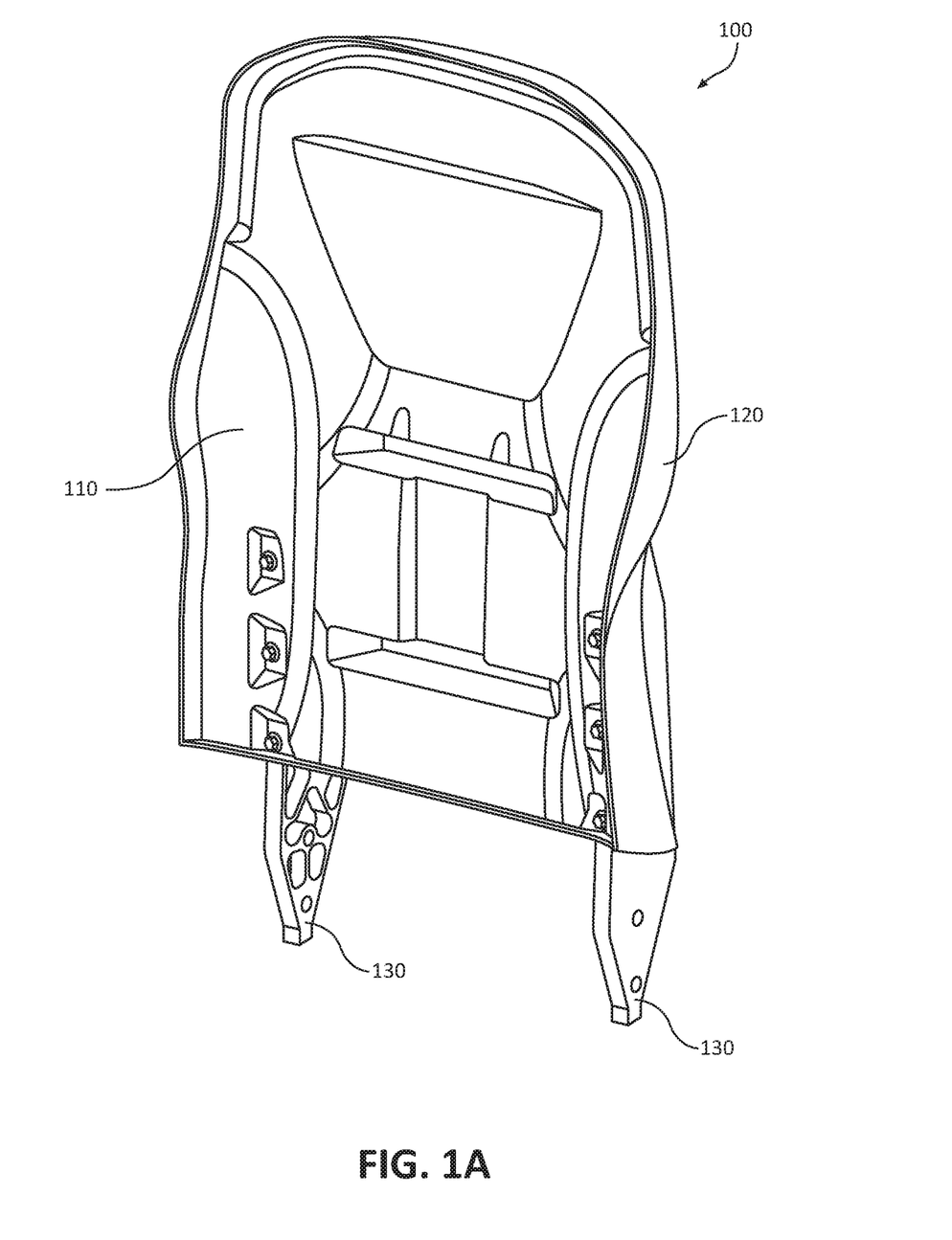
FIG. 1A illustrates a front perspective view of a modular monocoque backrest, in accordance with various embodiments.
Figure 1B:
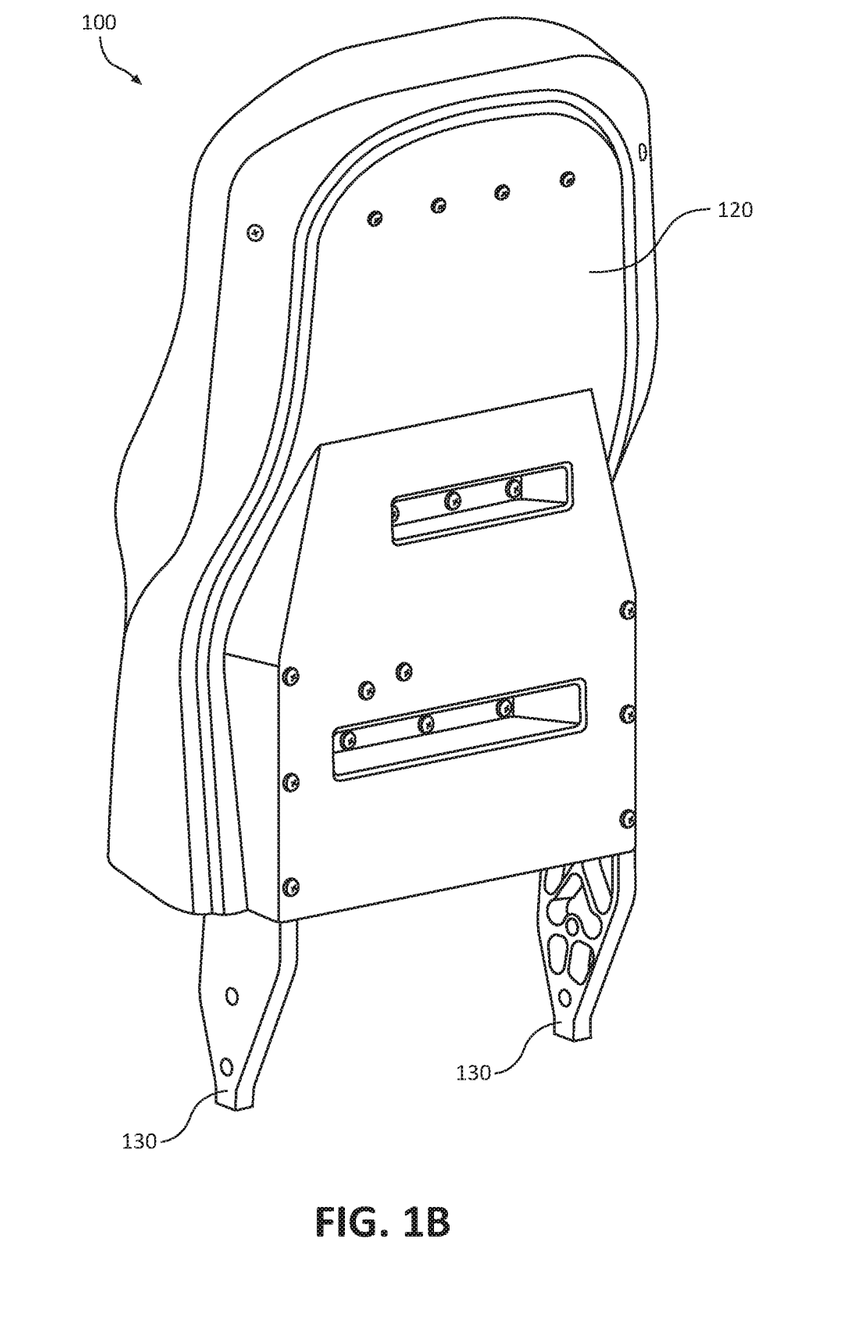
FIG. 1B illustrates a back perspective view of a modular monocoque backrest, in accordance with various embodiments.
Figure 1C:
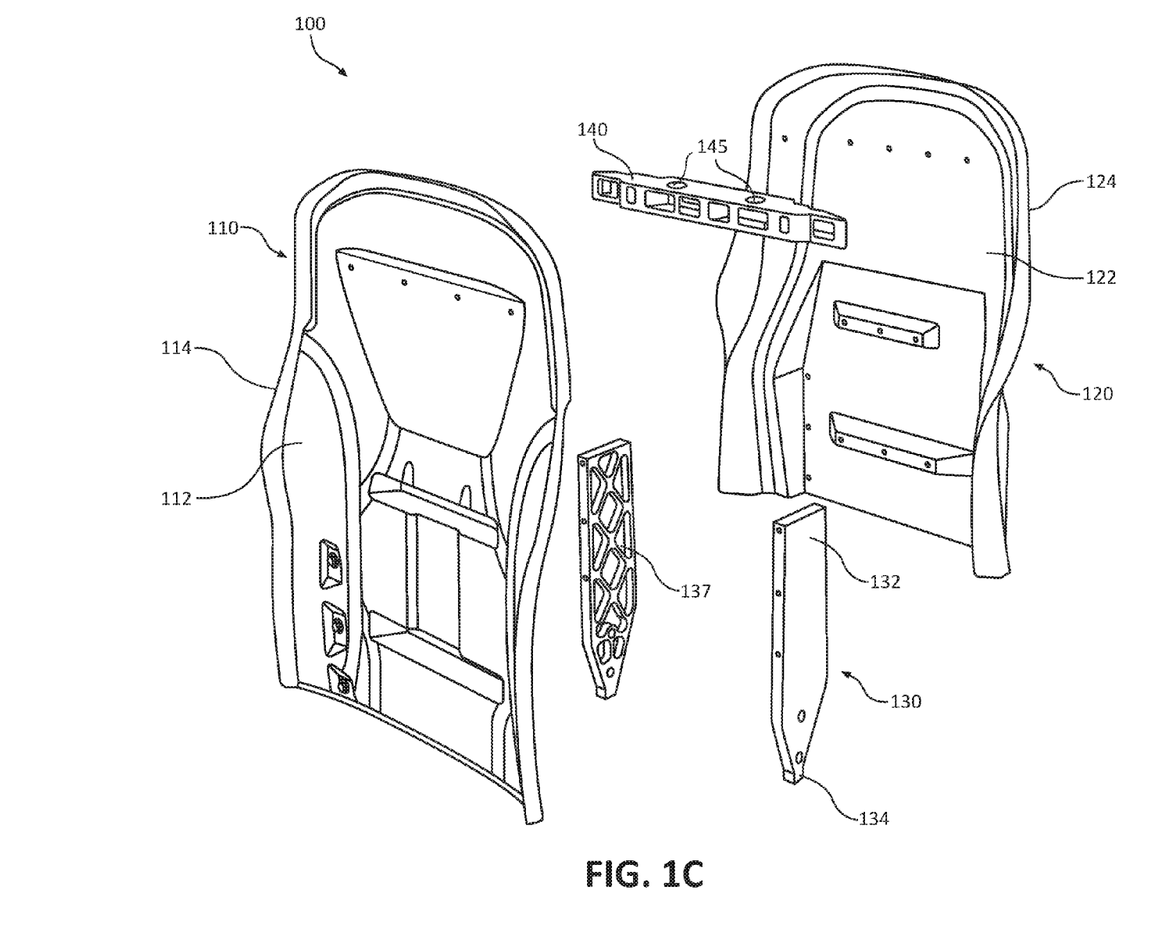
FIG. 1C illustrates an exploded perspective view of a modular monocoque backrest, in accordance with various embodiments.

In various embodiments, and with reference to FIGS. 1A, 1B, and 1C, a modular monocoque backrest 100 is disclosed. Modular monocoque backrest 100 may be configured to provide a structure that is lighter in weight than conventional backrest structures, while also maintaining resistance to dynamic crash loads. Moreover, modular monocoque backrest 100 may also allow for exterior styling and decorative features without the need for additional exterior shrouding parts. In various embodiments, modular monocoque backrest 100 may comprise any suitable lightweight and structurally durable material. In this regard, modular monocoque backrest 100 may comprise a carbon fiber composite. Modular monocoque backrest 100 may also comprise a composite reinforcement material such as fiberglass and/or phenolic. Modular monocoque backrest 100 may be fabricated using any suitable carbon fiber manufacturing technique. For example, modular monocoque backrest 100 may be fabricated using a carbon fiber layup method, and molded into any desired shape and/or size. Any suitable layup method may be used to fabricate modular monocoque backrest 100. Modular monocoque backrest 100 may also comprise any suitable coating and/or cover. For example, modular monocoque backrest 100 may be wrapped in leather, and/or any other suitable material, as desired.

In various embodiments, the use of a carbon fiber composite molded design may enable modular monocoque backrest 100 to distribute and support stress loads through the external body of modular monocoque backrest 100, without the need for additional metallic components for reinforcement. Moreover, a carbon fiber composite molded design may also enable modular monocoque backrest 100 to modularly incorporate additional design features into the molded design, eliminating the need for additional external mounting brackets, hardware, and/or the like. For example, modular monocoque backrest 100 may be molded to comprise a back literature pocket. Modular monocoque backrest 100 may also be molded to further comprise mounting brackets for a back literature pocket, and the back literature pocket may be fastened on. Modular monocoque backrest 100 may also be molded to comprise mounting provisions for speakers, lights, heating and/or cooling elements, arm rests, and/or any other suitable accessory. The use of a carbon fiber composite molded design may also enable modular monocoque backrest 100 to mold into any desired shape and/or size. Desired exterior styling and designs may therefore be incorporated without the need for extra exterior shrouding parts.

In various embodiments, modular monocoque backrest 100 may further distribute and support stress loads by incorporating support materials. In this regard, support materials may be added to the interior of modular monocoque backrest 100, in a position inward from the outer surfaces. For example, modular monocoque backrest 100 may comprise a support material in the interior having a honeycomb structure. The honeycomb structure may comprise a carbon fiber material, and/or any other suitable material cable of providing further support to modular monocoque backrest 100. The honeycomb structure may comprise a separate object from modular monocoque backrest 100, or the honeycomb structure may also integrate with modular monocoque backrest 100. In various embodiments, a foam core may also be implemented in the interior of modular monocoque backrest 100. The foam core may be configured to further distribute and support stress loads.

In various embodiments, modular monocoque backrest 100 may comprise a front shroud 110, a back shroud 120, and a back spar 130. Front shroud 110 may be configured to provide structural support to modular monocoque backrest 100. Referring to FIG. 1C, front shroud 110 may comprise a cushion support surface 112 and a connecting surface 114. Cushion support surface 112 may comprise an outer surface of modular monocoque backrest 100 after front shroud 110 is coupled to back shroud 120. Cushion support surface 112 may be configured to couple to a cushion, pad, and/or the like. Connecting surface 114 may comprise an inner surface of modular monocoque backrest 100 after front shroud 110 is coupled to back shroud 120. In this regard, connecting surface 114 may be configured as the surface of front shroud 110 that couples to back shroud 120.

In various embodiments, back shroud 120 may be configured to provide further structural support to modular monocoque backrest 100. Back shroud 120 may comprise a connecting surface 122 and a back surface 124. Connecting surface 122 may comprise an inner surface of modular monocoque backrest 100 after front shroud 110 is coupled to back shroud 120. In this regard, connecting surface 122 may be configured as the surface of back shroud 120 that couples to front shroud 110. Back surface 124 may comprise an outer surface of modular monocoque backrest 100 after front shroud 110 is coupled to back shroud 120.

In various embodiments, front shroud 110 may be configured to couple to back shroud 120. In this regard, connecting surface 114 of front shroud 110 may be configured to couple to connecting surface 122 of back shroud 120. Front shroud 110 may be coupled to back shroud 120 using any suitable technique. For example, front shroud 110 may couple to back shroud 120 using an adhesive and/or bonding agent, such as an epoxy used for composite bonding, a resin, a thermoset, and/or a thermoplastic. Front shroud 110 may also couple to back shroud 120 using a mechanical fastener, such as a rivet, screw, and/or the like. Mechanical fasteners may be used at various intervals around the perimeter of modular monocoque backrest 100 to ensure a secure coupling between front shroud 110 and back shroud 120. For example, mechanical fasteners may be used at about every one inch, two inches, and/or any other suitable and/or desired interval. In various embodiments, front shroud 110 may be coupled to back shroud 120 using a combination of coupling techniques, such as, for example, through the use of both an adhesive and a mechanical fastener.

In various embodiments, back spar 130 may provide a mounting point to mount modular monocoque backrest 100 to a surface, such as an aircraft floor, for example. Back spar 130 may also provide additional structural support for modular monocoque backrest 100 against torsional loads, inflight abuse loads, and/or crash loads. Back spar 130 may protrude downward from front shroud 110 and back shroud 120. In various embodiments, modular monocoque backrest 100 may comprise a plurality of back spars 130. Back spar 130 may comprise any suitable material. For example, back spar 130 may comprise a metal material, such as aluminum. In various embodiments, back spar 130 may also comprise a carbon fiber material. Back spar 130 may be molded into front shroud 110 and/or back shroud 120, such that back spar 130 and front shroud 110 and/or back shroud 120 may form a single continuous part. In this regard, back spar 130, front shroud 110, and back shroud 120 may form an integral component in modular monocoque backrest 100.

In various embodiments, back spar 130 may comprise a top end 132 opposite of a bottom end 134. Top end 132 may comprise the end of back spar 130 proximate to modular monocoque backrest 100, and bottom end 134 may comprise the end of back spar 130 located furthest away from modular monocoque backrest 100. Top end 132 may be configured to couple back spar 130 to modular monocoque backrest 100. Top end 132 may be configured to couple to front shroud 110 and/or back shroud 120. Top end 132 may be coupled to front shroud 110 and back shroud 120 using any suitable method, such as via a mechanical fastener. Top end 132 may be inserted between the coupling of front shroud 110 and back shroud 120, and couple at a first edge to connecting surface 114 of front shroud 110 and at a second edge to connecting surface 122 of back shroud 120. Bottom end 134 may comprise the mounting point for back spar 130, and may be configured to mount to a surface, such as an aircraft floor for example. Back spar 130 may also comprise a plurality of cross bracings 137, configured to provide additional structural support to modular monocoque backrest 100. Cross bracings 137 may comprise a plurality of voids on the inner surface of back spar 130, configured to increase the structural strength of back spar 130. In this regard, the use of cross bracings 137 may also allow for a lighter weight back spar 130.

Figures 2A, 2B:
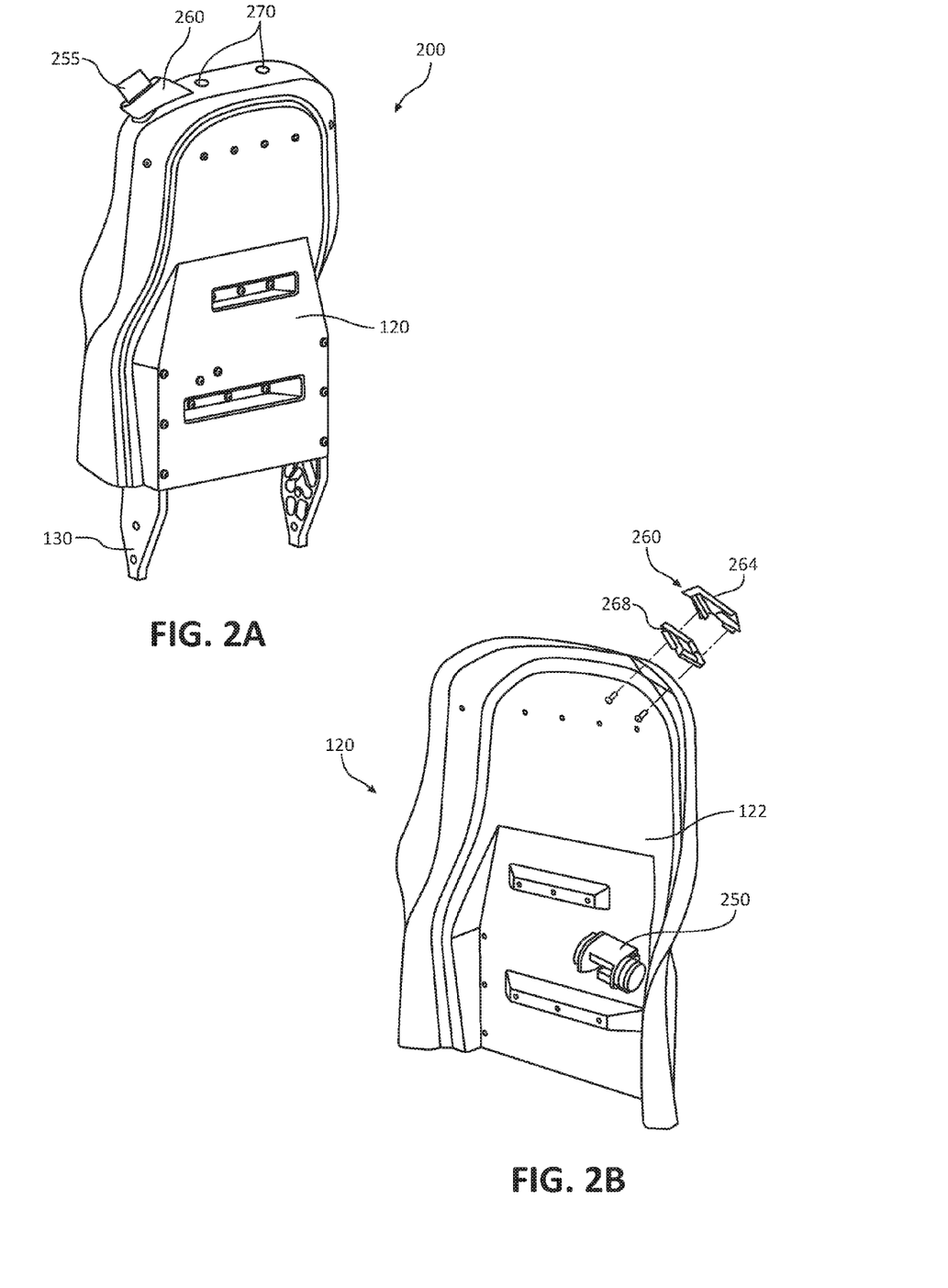
FIG. 2A illustrates a back perspective view of a modular monocoque backrest further comprising a restraint system, in accordance with various embodiments.
FIG. 2B illustrates a front perspective view of a back shroud of a modular monocoque backrest further comprising a restraint system, in accordance with various embodiments.

In various embodiments, modular monocoque backrest 100 may also comprise a headrest bracket 140. Headrest bracket 140 may be configured to receive a headrest (e.g., through headrest support holes 270, as depicted in FIG. 2A) and provide structural support for the headrest. In this regard, headrest bracket 140 may comprise a plurality of voids 145 configured to receive and secure a headrest. Headrest bracket 140 may comprise any suitable material. For example, headrest bracket 140 may comprise an aluminum material. Headrest bracket 140 may be coupled to connecting surface 114 of front shroud 110 and connecting surface 122 of back shroud 120, such that headrest bracket 140 may fit between the coupling of front shroud 110 to back shroud 120. In various embodiments, headrest bracket 140 may also comprise a carbon fiber material. Headrest bracket may be molded directly with back shroud 120, such that back shroud 120 and headrest bracket 140 may comprise a single continuous part. In this regard, headrest bracket 140, front shroud 110, and back shroud 120 may form an integral component in modular monocoque backrest 100.

In various embodiments, and with reference to FIGS. 2A and 2B, a modular monocoque backrest 200 further comprising restraint devices is disclosed. In this regard, modular monocoque backrest 200 may comprise a variety of restraint and safety devices and/or mechanisms. In various embodiments, a restraint inertia reel 250 may be configured to deploy and retract a shoulder restraint belt 255. Restraint inertia reel 250 may comprise a spring-loaded reel capable of deploying and retracting shoulder restraint belt 255. Restraint inertia reel 250 may also comprise an inertial locking mechanism, or other such similar apparatus and/or mechanism, capable of preventing shoulder restraint belt 255 from deploying further during a sudden acceleration. Restraint inertia reel 250 may be coupled to connecting surface 122 of back shroud 120. Restraint inertia reel 250 may be coupled to connecting surface 122 of back shroud 120 using a mounting bracket, bolt, and/or the like. In various embodiments, connecting surface 122 of back shroud 120 may be molded to comprise a mounting bracket for restraint inertia reel 250. In that regard, restraint inertia reel 250 may bolt on to connecting surface 122 without the need for additional hardware and/or mounting brackets.

In various embodiments, shoulder restraint belt 255 may deploy from restraint inertia reel 250 through a restraint exit 260. Shoulder restraint belt 255 may then be configured to connect to a female safety attachment member, such as restraint buckle and/or the like, located on a seat. Restraint exit 260 may comprise any suitable material, such as aluminum. In various embodiments, restraint exit 260 may also comprise a carbon fiber material. In this regard, restraint exit 260 may be molded directly into back shroud 120, such that back shroud 120 and restraint exit 260 comprise a single continuous part. Restraint exit 260 may comprise a restraint support 268 and a restraint bezel 264. Restraint support 268 may be configured to structurally guide and support shoulder restraint belt 255 while deployed. Restraint support 268 may be coupled to the top of back shroud 120. In this regard, back shroud 120 may be molded to comprise a void and restraint support 268 may substantially align with the void to allow shoulder restraint belt 255 to pass through the top of back shroud 120. Restraint bezel 264 may be configured to protect restraint support 268 and to provide structural support for shoulder restraint belt 255 after shoulder restraint belt 255 is deployed. Restraint bezel 264 may also be decorative in nature, comprising a metal plating and/or the like.

Figure 3:
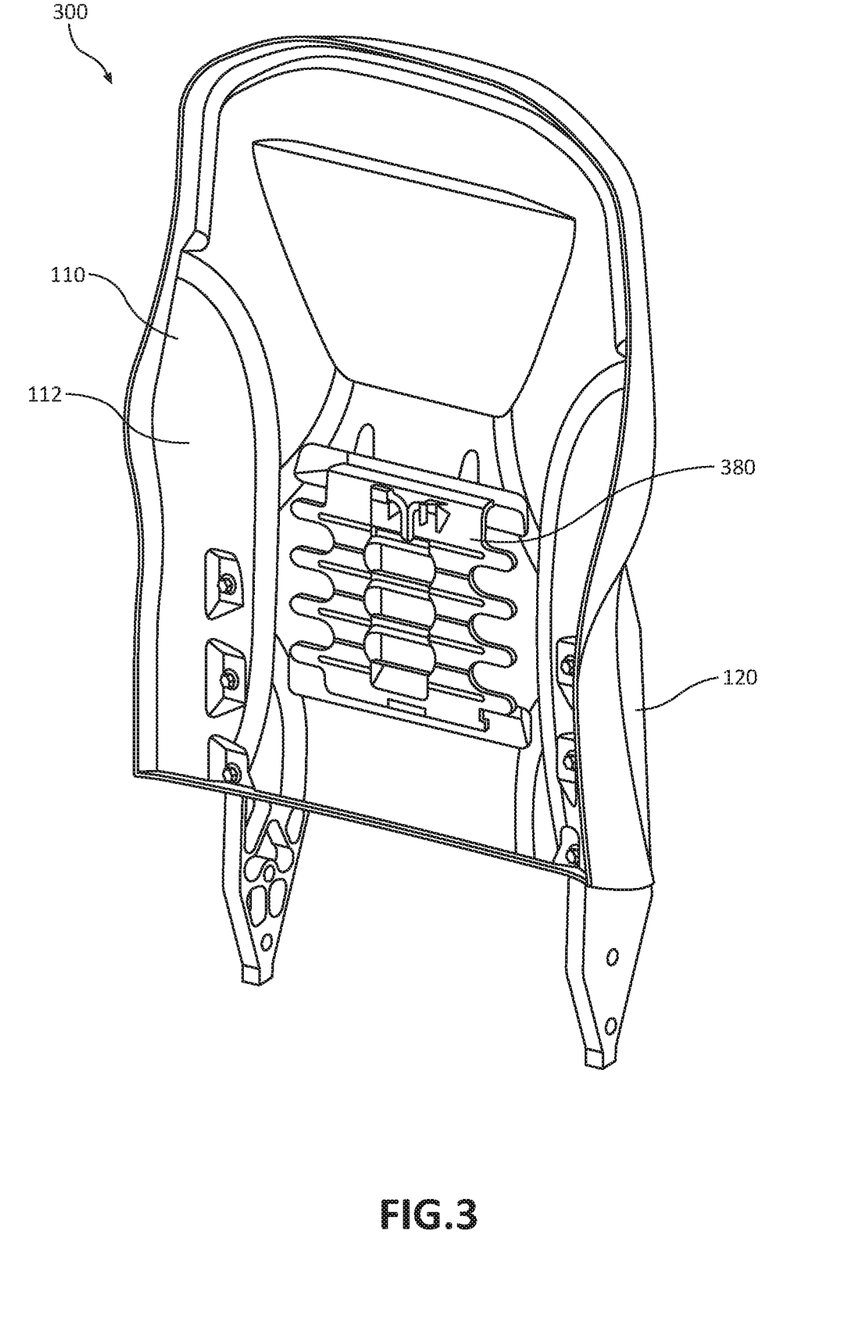
FIG. 3 illustrates a front perspective view of a modular monocoque backrest further comprising a lumbar support mechanism, in accordance with various embodiments.

In various embodiments, and with reference to FIG. 3, a modular monocoque backrest 300 further comprising a lumbar support mechanism 380 is depicted. Lumbar support mechanism 380 may be coupled to cushion support surface 112 of front shroud 110. Lumbar support mechanism 380 may be located in any suitable location on cushion support surface 112, such as, for example, in the general lumbar region of cushion support surface 112. Lumbar support mechanism 380 may couple to cushion support surface 112 using any suitable technique, such as via a mounting bracket, fastener, bolt, and/or the like. In various embodiments, cushion support surface 112 may also be molded to comprise mounting brackets, and/or the like, enabling lumbar support mechanism 380 to couple to cushion support surface 112 without the need of additional hardware and/or mounting brackets.

In various embodiments, lumbar support mechanism 380 may be configured to adjustably vary the amount of lumbar support in modular monocoque backrest 300. For example, lumbar support mechanism 380 may adjust to protrude outward from front shroud 110. The outward protrusion may provide a passenger with greater support and comfort in the lumbar region. In various embodiments comprising a cushion coupled to the surface of cushion support surface 112, the adjusted lumbar support mechanism 380 may protrude outward causing a curvature of the cushion in the lumbar area. Lumbar support mechanism 380 may also comprise a mechanical and/or electrical device allowing for adjustment to the level of outward protrusion. In this regard, lumbar support mechanism 380 may allow for a change in the protrusion amount to vary the distance lumbar support mechanism 380 is protruding away from front shroud 110. Lumbar support mechanism 380 may be adjusted using any suitable device, such as, for example, through electronic controls, mechanical controls, and/or the like.

Benefits, other advantages, and solutions to problems have been described herein with regard to specific embodiments. Furthermore, the connecting lines shown in the various figures contained herein are intended to represent exemplary functional relationships and/or physical couplings between the various elements. It should be noted that many alternative or additional functional relationships or physical connections may be present in a practical system. However, the benefits, advantages, solutions to problems, and any elements that may cause any benefit, advantage, or solution to occur or become more pronounced are not to be construed as critical, required, or essential features or elements of the disclosures. The scope of the disclosures is accordingly to be limited by nothing other than the appended claims and their legal equivalents, in which reference to an element in the singular is not intended to mean "one and only one" unless explicitly so stated, but rather "one or more." Moreover, where a phrase similar to "at least one of A, B, or C" is used in the claims, it is intended that the phrase be interpreted to mean that A alone may be present in an embodiment, B alone may be present in an embodiment, C alone may be present in an embodiment, or that any combination of the elements A, B and C may be present in a single embodiment; for example, A and B, A and C, B and C, or A and B and C.

Systems, methods and apparatus are provided herein. In the detailed description herein, references to "various embodiments", "one embodiment", "an embodiment", "an example embodiment", etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described. After reading the description, it will be apparent to one skilled in the relevant art(s) how to implement the disclosure in alternative embodiments.

Furthermore, no element, component, or method step in the present disclosure is intended to be dedicated to the public regardless of whether the element, component, or method step is explicitly recited in the claims. No claim element herein is to be construed under the provisions of 35 U.S.C. 112(f), unless the element is expressly recited using the phrase "means for." As used herein, the terms "comprises", "comprising", or any other variation thereof, are intended to cover a non-exclusive inclusion, such that a process, method, article, or apparatus that comprises a list of elements does not include only those elements but may include other elements not expressly listed or inherent to such process, method, article, or apparatus.

What is claimed is:

1. A seat backrest, comprising:
a front shroud formed from a first molded carbon fiber composite material and comprising upper and lower lumbar support mounting brackets, each bracket comprising a pocket that is elongate in a width direction, protrudes rearwardly of a rear face of the front shroud, opens forwardly through a front face of the front shroud, and is formed as one-piece with the front shroud;
a back shroud coupled to the front shroud and formed from a second molded carbon fiber composite material;
an at least one back spar disposed between and coupled to the front shroud and the back shroud, wherein the at least one back spar extends in a direction away from the front shroud and the back shroud, and a lumbar support mechanism coupled to the front face of the front shroud via the lumbar support mounting brackets.

2. The seat backrest of claim 1, further comprising a headrest bracket coupled at a first end to the back shroud and coupled at a second end to the front shroud.

3. The seat backrest of claim 1, further comprising a restraint exit coupled to the back shroud, wherein the restraint exit defines a void on the back shroud, and wherein the void is configured to allow passage of a shoulder restraint belt.

4. The seat backrest of claim 3, further comprising a restraint inertia reel coupled to the back shroud, wherein the restraint inertia reel is configured to deploy and retract the shoulder restraint belt through the restraint exit.

5. The seat backrest of claim 3, wherein the restraint exit comprises a restraint support having a top surface opposite of a bottom surface, wherein the bottom surface is coupled to the back shroud, and wherein a restraint bezel is coupled to the top surface.

6. The seat backrest of claim 3, wherein the restraint exit comprises the second carbon fiber composite material, and wherein the restraint exit is molded with the back shroud such that the back shroud and the restraint exit comprise a single continuous part.

7. The seat backrest of claim 1, wherein the at least one back spar comprises an aluminum material.

8. The seat backrest of claim 7, wherein the at least one back spar comprises a plurality of cross bracings.

9. A modular monocoque backrest, comprising:
a front shroud having a cushion support surface opposite of a first connecting surface, the front shroud comprising upper and lower lumbar support mounting brackets, each bracket comprising a pocket that is elongate in a width direction, protrudes rearwardly of the first connecting surface of the front shroud, opens forwardly through the cushion support surface of the front shroud, and is formed as one-piece with the front shroud, wherein the front shroud comprises a first carbon fiber composite material;
a back shroud having a second connecting surface opposite of a back surface, wherein the back shroud comprises a second carbon fiber composite material, and wherein the second connecting surface of the back shroud is integrally coupled to the first connecting surface of the front shroud such that the front shroud and the back shroud form a single integrated object;
an at least one back spar having a top end opposite of a bottom end, wherein the top end comprises first and second edges and is coupled at the first edge to the first connecting surface of the front shroud and coupled at the second edge to the second connecting surface of the back shroud, and wherein the bottom end extends in a direction away from the front shroud and the back shroud; and a lumbar support mechanism coupled to the cushion support surface of the front shroud via the lumbar support mounting brackets.

10. The modular monocoque backrest of claim 9, further comprising a headrest bracket comprising first and second ends, the headrest bracket coupled at the first end to the second connecting surface of the back shroud and coupled at the second end to the first connecting surface of the front shroud.

11. The modular monocoque backrest of claim 9, further comprising a restraint exit coupled to a top of the back shroud, wherein the restraint exit defines a void on the top of the back shroud, configured to allow passage of a shoulder restraint belt.

12. The modular monocoque backrest of claim 11, further comprising a restraint inertia reel coupled to the second connecting surface of the back shroud, wherein the restraint inertia reel is configured to deploy and retract the shoulder restraint belt through the restraint exit.

13. The modular monocoque backrest of claim 11, wherein the restraint exit comprises a restraint support coupled to the top of the back shroud, and a restraint bezel coupled to the top of the restraint support.

14. The modular monocoque backrest of claim 11, wherein the restraint exit comprises the second carbon fiber composite material, and wherein the restraint exit is molded with the back shroud such that the back shroud and the restraint exit comprise a single continuous part.

15. The modular monocoque backrest of claim 9, wherein the at least one back spar comprises an aluminum material.

16. The modular monocoque backrest of claim 15, wherein the at least one back spar comprises a plurality of cross bracings.

* * * * *